C. A. HAAS.
VALVE STEM AND CHECK VALVE THEREFOR.
APPLICATION FILED MAR. 6, 1911.
1,078,347.
Patented Nov. 11, 1913.
2 SHEETS—SHEET 1.
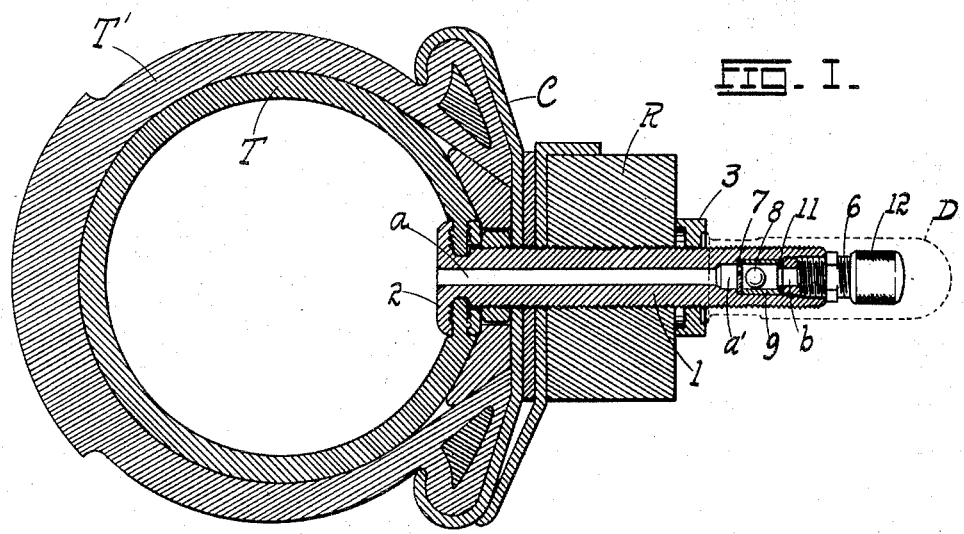
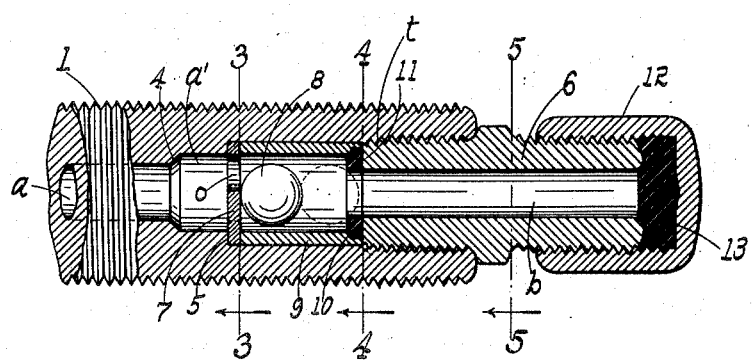
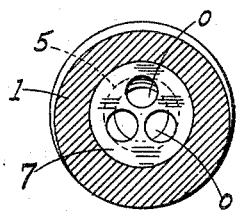 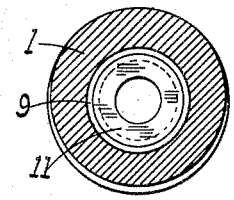 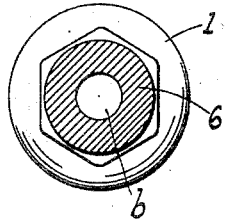
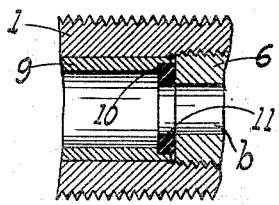
WITNESSES:
Harry A. Beimer
Josamichel
INVENTOR.
Cyrus A. Haas
BY Ernst Tarer
ATTORNEY.

C. A. HAAS.
VALVE STEM AND CHECK VALVE THEREFOR.
APPLICATION FILED MAR. 6, 1911.

1,078,347.

Patented Nov. 11, 1913.
2 SHEETS—SHEET 2.

WITNESSES:
Harry A. Bennes
Jos. A. Michel

INVENTOR.
[signature]
BY
[signature]
ATTORNEY.

UNITED STATES PATENT OFFICE.

CYRUS A. HAAS, OF ST. LOUIS, MISSOURI.

VALVE-STEM AND CHECK-VALVE THEREFOR.

1,078,347.  Specification of Letters Patent.  Patented Nov. 11, 1913.

Application filed March 6, 1911. Serial No. 612,461.

*To all whom it may concern:*

Be it known that I, CYRUS A. HAAS, citizen of the United States, residing at St. Louis, State of Missouri, have invented certain new and useful Improvements in Valve-Stems and Check-Valves Therefor, of which the following is a full, clear, and exact description, reference being had to the accompanying drawings, forming a part hereof.

My invention has relation to improvements in valve-stems for automobile tires, and check-valves therefor; and it consists in the novel details of construction more fully set forth in the specification and pointed out in the claims.

Figure 7:
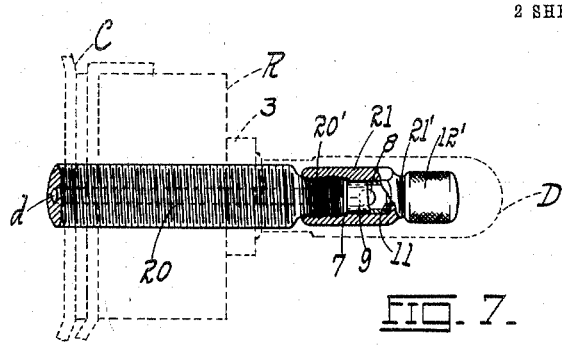
Figure 8:
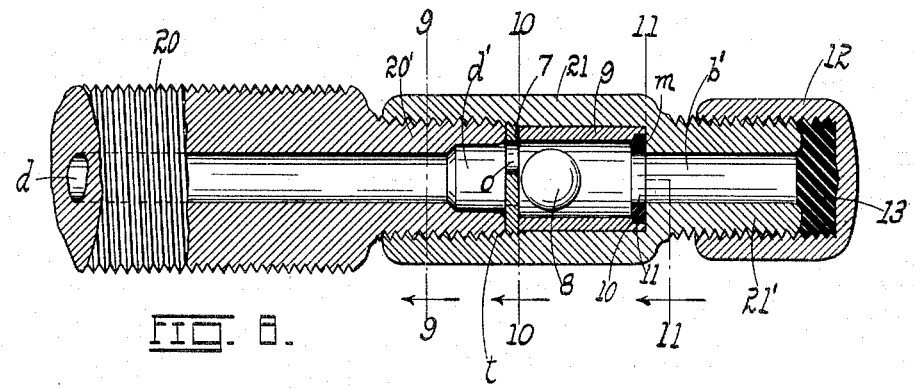
Figure 9:
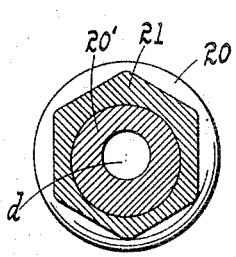
Figure 10:
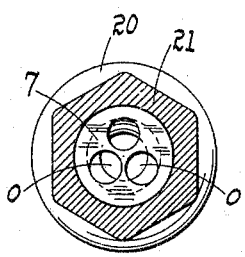
Figure 11:
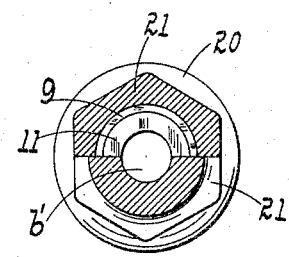
Figure 12:
Figure 13:
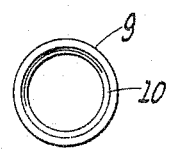

In the drawings, Figure 1 is a cross-section of a pneumatic tire and supporting rim, showing one form of my invention applied thereto; Fig. 2 is an enlarged middle longitudinal section of the outer end of the valve-stem and the valve-cap-carrying extension; Fig. 3 is a cross-section on the line 3—3 of Fig. 2; Fig. 4 is a cross-section on the line 4—4 of Fig. 2; Fig. 5 is a cross-section on the line 5—5 of Fig. 2; Fig. 6 is a longitudinal sectional detail showing the rubber gasket at the inner end of the valve-cap carrying extension before compression; Fig. 7 is a side view of a valve-stem showing partly in section, a valve-casing to which my improved valve-seat or rubber gasket may be applied; Fig. 8 is an enlarged middle longitudinal section of the outer end of the valve-stem and valve-casing shown in Fig. 7; Fig. 9 is a cross-section on the line 9—9 of Fig. 8; Fig. 10 is a cross-section on the line 10—10 of Fig. 8; Fig. 11 is a cross-section on the broken line 11—11 of Fig. 8; Fig. 12 is a longitudinal section and elevation of the bushing in which the valve is confined; and Fig. 13 is an end view of Fig. 12.

The object of my invention is to provide the prevailing form of automobile or other pneumatic tire with a check-valve and seat therefor identified either with the valve-stem leading from the tire, or with a valve-casing supported by such stem, with a view of securing an air tight joint between the valve and its seat while the tire is in service, such joint being eminently effective for preventing leakage without dependence on the supplemental joint formed by the outer terminal valve-cap which must be removed each time the tire is being inflated.

A further object is to provide a construction which will permit of a ready and easy flow of the air for quick inflation, between the inflating pump and the tire; one which eliminates practically all resistance to the inflating current; a construction which is simple, reliable and durable, and one possessing further and other advantages better apparent from a detailed description of the invention which is as follows:

Referring to the drawings, and for the present to Figs. 1 to 6 inclusive, T represents the inner inflatable tube, and T' the outer section as well understood in the art. In the present illustration is shown a wooden felly R to which the rubber section T' is secured by the clencher C likewise familiar to those skilled in the art. In the prevailing forms of pneumatic tires, there is present what is known as the valve-stem 1 terminating at its inner end in a head or mouth 2 which communicates with the inflatable section T, the stem being exteriorly screw-threaded and carrying a lock-nut 3 by which the parts are secured, and drawn firmly together. With the foregoing features however, my invention is not immediately concerned, said invention being directed to details to be now described.

At a point beyond or outside the felly R, the passage-way $a$ of the valve-stem is enlarged as at $a'$, a bevel shoulder 4 being formed between the parts $a$ and $a'$ (Fig. 2), the outer end of the portion $a'$ terminating at an annular ledge or shoulder 5 formed between the walls of said portion $a'$ and the walls of the inner unthreaded cylindrical portion of the outer cavity of the valve-stem, by which the screw-threaded valve-cap-carrying tubular extension 6 is received. Upon this ledge or shoulder 5 rests the valve-check, abutment, or stop-disk 7, said disk being provided with a number of ports or openings $o$ clustered about the center of the disk, the valve or ball 8 when unseated (during the inflating operation) being arrested by said disk, the inflating air flowing freely around the valve through the openings $o$ into the tire section T. The disk 7 is held to its ledge or shoulder 5 by a cylindrical bushing 9 confined in the cylindrical smooth portion or valve-housing of the outer valve-stem cavity aforesaid, the outer portion of said cavity being interiorly screw-threaded and tapering inwardly at the bottom (Fig. 2), so that when the inner cylindrical end of the extension 6 is driven home, the tapering walls of said screw-threaded portion of the cavity will distort the walls of the extension 6, and form a very tight joint, thus dispensing with the necessity of packing or leading. The outer end of the bushing 9 (which confines the ball or valve 8) is formed with an inner recess resulting in an annular shoulder 10 for the initial deposit thereon of a compressible (rubber or equivalent) gasket ring 11 encompassed by the bushing (Fig. 6), and when the member 6 is driven fully home against said gasket, it forces or squeezes a small section of said gasket past the inner edge of the shoulder and into the hollow of the bushing (Fig. 2), so as to make a very effective joint and prevent not only any possible leakage of air past said joint and between the engaged portions of the members 1 and 6, but to prevent dislodgment of the gasket by the inflating current. The width of the ring or gasket 11 is such as to afford a yielding seat for the valve 8 (the walls of the gasket-opening being continuous or flush with those of the passage $b$ of the member 6), and when the valve is resting on said seat under the pressure of the air from the tube T, no air can pass this seat. It follows therefore, that even should the valve-cap 12 and its packing disk 13 be dispensed with or forgotten, the seat 11 may be depended on to furnish a tight joint.

It may be stated that the bore $b$ of the member 6 is substantially the same in cross-section with the bore $a$ of the valve-stem 1, the areas of the ports $o$ and the available space around the valve 8 within the bushing 9, being likewise equal to the areas of the respective cross-sections of the bores $a$, $b$, so that the air is free to flow without obstruction into the tube T during inflation.

D represents in outline a dust-cap or shield usually passed over the member 6 and its valve-cap 12. To inflate the tire the dust-cap D and valve-cap 12 and disk 13 are removed, the hose conducting the compressed air is attached to the outer end of the member 6, and when the pressure within the hose equalizes that within the tube T, the valve 8 leaves its seat. As the pressure within the hose rises, it forces the valve 8 against the disk or abutment 7, the inflating current floating without obstruction into the tube T. When the inflating operation is complete and the hose detached, the compressed air within the tube T drives the valve 8 to its compressible seat 11; after this the parts 12, 13 and D are restored. No possible leakage of air through the valve-stem past the valve 8 is possible after a tire is once inflated.

In the form above described, the valve 8 with its bushing 9, disk 7 and seat 11 are inclosed by the inner section of the valve-stem, but it is obvious that these parts may be transferred to, or placed in the outer member or that with which the valve-cap is identified. This is just what is accomplished in the modification shown in Figs. 7 to 13 inclusive. In said modification the valve-stem 20 terminates in an outer nipple 20' over which is screwed a valve-casing 21, the outer portion of which terminates in a reduced stem 21' over the end of which the valve-cap 12 (with its packing disk 13) is passed. In this modification the parts 7, 8, 9, shoulder 10, ring 11, and dust cap D, valve-cap 12 and disk 13, are identical with those already described and are identified with the same reference numerals. The bores $d$, $d'$, $b'$, of the parts 20, 21, correspond too, to the equivalent bores $a$, $a'$, $b$, in the members 1 and 6. In the modification however, the disk 7 is interposed between the end of the nipple 20' and the bushing 9, the latter being confined in the casing 21, the ring 11 resting with one face on a ledge $m$ at the base of the stem 21' (Fig. 8), the opposite face engaging the shoulder 10 of the bushing 9. In this modification, a taper is likewise formed at the base of the cavity receiving the nipple 20', so as to effect a tight joint without the necessity of leading or packing.

It may be stated in conclusion that the valve mechanism, the joint $t$, and the terminal cap 12 and packing disk 13 are identical in both forms of my invention, except that in the first form described the taper joint $t$ is adjacent the seat 11, whereas in the second form it is adjacent to the abutment or disk 7.

Having described my invention, what I claim is:—

1. In combination with a tubular valve-housing, a perforated abutment at one end thereof, a perforated gasket at the opposite end, a bushing interposed between the abutment and gasket, the end of the bushing engaging the gasket being provided with an inner annular recess forming a wall for engaging the periphery of the gasket and a supporting shoulder for engaging the face of the gasket.

2. In combination with a tubular valve-housing, a perforated abutment at one end thereof, a perforated gasket at the opposite end, and a bushing in the housing encompassing the gasket and provided with an annular shoulder for supporting said gasket.

3. In combination with a tubular valve-housing, a perforated abutment at one end thereof, a perforated compressible gasket at the opposite end, a bushing in the housing encompassing the gasket and provided with an annular shoulder forming a support for the gasket, and a valve within the bushing operating between the abutment and gasket.

4. An automobile-tire valve-stem provided with a passage-way having an enlargement within the stem, a shoulder at the base of said enlargement, a perforated valve-check or abutment bearing against said shoulder, a hollow bushing within said enlargement having one end engaging the abutment, the opposite end of the bushing being provided with an inner shoulder, a compressible perforated gasket serving as a valve-seat encompassed by the bushing and engaging said shoulder, a hollow valve-cap-carrying member screwed into the valve-stem, and forcing the gasket against the shoulder of the bushing, and a ball valve confined within the bushing between the abutment and valve-seat.

5. In combination with a cylindrical bushing having an inner formation at one end serving as a support, a perforated abutment engaging the opposite end of the bushing, an annular compressible gasket within the bushing engaging said support, and a perforated member for forcing and compressing the gasket against the support aforesaid.

6. In combination with a tubular bushing having an inner annular formation at one end serving as a support, a compressible annular gasket within the bushing engaging said support, means for forcing the gasket against said support sufficiently to force one face thereof slightly beyond the support, a perforated abutment bearing against the opposite end of the bushing, and a ball-valve within the bushing.

7. In combination with a tubular bushing, a valve within the bushing, one end of the bushing having an inner formation serving as a support, a compressible gasket having an opening, engaging said support, a perforated valve-check or abutment engaging the opposite end of the bushing and resting on a suitable support, means for pressing the gasket against the support engaged thereby, at the same time forcing the bushing against the abutment and its fixed support for effecting a tight joint at both ends of the bushing.

In testimony whereof I affix my signature, in presence of two witnesses.

CYRUS A. HAAS.

Witnesses:
EMIL STAREK,
JOS. A. MICHEL.